(12) United States Patent
Kumar et al.

(10) Patent No.: US 11,132,131 B2
(45) Date of Patent: Sep. 28, 2021

(54) CONSISTENTLY ENFORCING I/O RESOURCE CONSTRAINTS FOR WORKLOADS ON PARALLEL-ACCESS STORAGE DEVICES

(71) Applicant: ORACLE INTERNATIONAL CORPORATION, Redwood Shores, CA (US)

(72) Inventors: Kishy Kumar, Redwood City, CA (US); Akshay Shah, Sunnyvale, CA (US); Kothanda Umamageswaran, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2 days.

(21) Appl. No.: 16/730,608

(22) Filed: Dec. 30, 2019

(65) Prior Publication Data

US 2020/0278799 A1 Sep. 3, 2020

Related U.S. Application Data

(60) Provisional application No. 62/812,174, filed on Feb. 28, 2019.

(51) Int. Cl.
*G06F 12/00* (2006.01)
*G06F 3/06* (2006.01)
(Continued)

(52) U.S. Cl.
CPC .......... *G06F 3/0613* (2013.01); *G06F 3/0611* (2013.01); *G06F 3/0653* (2013.01); *G06F 3/0659* (2013.01); *G06F 3/0683* (2013.01)

(58) Field of Classification Search
CPC .... G06F 3/0613; G06F 3/0611; G06F 3/0659; G06F 3/0683; G06F 3/0653
See application file for complete search history.

(56) References Cited

U.S. PATENT DOCUMENTS 8,892,780 B2 11/2014 Lee et al.
9,772,798 B2 9/2017 Shah et al.
(Continued)

OTHER PUBLICATIONS

Oracle, Exadata, "A Technical Overview of the Oracle Exadata Database Machine and Exadata Storage Server", dated Jun. 2012, 36 pages.

(Continued)

*Primary Examiner* — Mark A Giardino, Jr.
(74) *Attorney, Agent, or Firm* — Hickman Becker Bingham Ledesma LLP

(57) ABSTRACT

The techniques described herein limit client utilization of a parallel-access storage device. Specifically, client utilization of a particular storage device is estimated using I/O cost metrics to estimate the costs of I/O requests from the client to the particular storage device. The I/O cost metrics are determined based on calibration-based system performance data, which represents a system-wide measure of storage device performance for a system in which the particular storage device resides. The calibration-based system performance data includes one or both of composite throughput data and composite IOPS data for multiple parallel-access devices in the system. The cost estimates for I/O requests issued from a client to a parallel-access device are tracked in a total cost estimate for the client. Client utilization of the storage device, as tracked by the total cost estimate for the client, is limited to a percentage of the total estimated bandwidth of the storage device.

22 Claims, 6 Drawing Sheets

(51) Int. Cl.
  *G06F 13/00* (2006.01)
  *G06F 13/28* (2006.01)

(56) References Cited

U.S. PATENT DOCUMENTS

| | | | |
|---|---|---|---|
| 2010/0082851 A1* | 4/2010 | Green | G06F 9/45558 710/29 |
| 2016/0098292 A1* | 4/2016 | Boutin | G06F 9/505 718/104 |
| 2016/0234297 A1* | 8/2016 | Ambach | H04L 67/1008 |
| 2017/0262192 A1* | 9/2017 | Aga | G06F 3/0656 |
| 2018/0081832 A1* | 3/2018 | Longo | G06F 3/0659 |

OTHER PUBLICATIONS

Oracle, "Oracle Exadata Database Machine X8-2", dated 2017, 25 pages.

\* cited by examiner

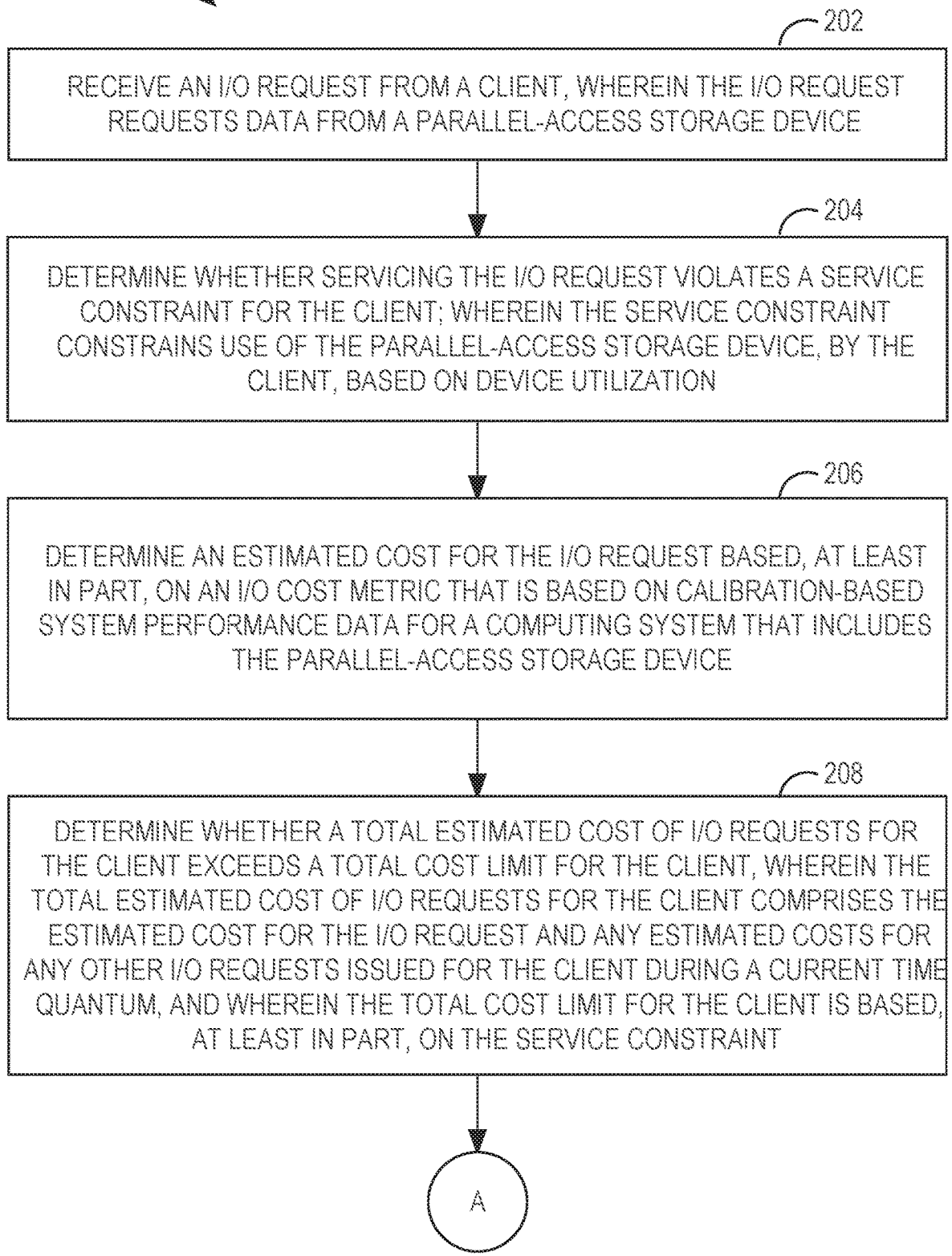

CONSISTENTLY ENFORCING I/O RESOURCE CONSTRAINTS FOR WORKLOADS ON PARALLEL-ACCESS STORAGE DEVICES

CROSS-REFERENCE TO RELATED APPLICATIONS; BENEFIT CLAIM

This application claims the benefit of Provisional Appln. 62/812,174, filed Feb. 28, 2019, the entire contents of which is hereby incorporated by reference as if fully set forth herein, under 35 U.S.C. § 119(e).

Further, this application is related to U.S. Pat. No. 9,772,798, titled "Method and system for implementing workload management by monitoring disk utilizations", filed Jun. 21, 2011, issued Sep. 26, 2017, the entire contents of which is hereby incorporated by reference as if fully set forth herein.

FIELD OF THE INVENTION

The present invention relates to limiting I/O resources for workloads and, more specifically, to ensuring consistent performance for workloads that are subject to an I/O limit on parallel-access devices.

BACKGROUND

Often, a storage system executes I/O requests for multiple clients/workloads running on shared storage. Such workloads may access different databases, may have different user and schema security levels, may be implemented by different application types or database session types, and may have different priorities and classes of I/O requests. Unfortunately, multiple types of workloads being serviced by shared storage often leads to performance and response time problems for the workloads. For example, large parallel queries on one production data warehouse can impact the performance of critical queries on another production data warehouse being executed by the same storage system. Also, existing load on a data warehouse can impact the performance of critical queries also running on the same data warehouse.

It is possible to mitigate these problems by over-provisioning the storage system. However, over-provisioning the storage system diminishes the cost-saving benefits of shared storage. It is also possible to schedule non-critical tasks at off-peak hours, but such scheduling is generally performed manually, and, as such, can be expensive. Further, such scheduling can be difficult to execute to the satisfaction of all parties, for example, when databases are run by different administrators who do not coordinate their respective activities.

In addition, it is desirable in many situations be able to manage the amount of resources that can be consumed by different workloads in a shared storage system. Specifically, when multiple workloads access a storage device concurrently, some I/O requests are serviced while other I/O requests that are not being serviced must wait in a hold queue. Resulting latencies in executing I/O requests should be balanced across the various workloads that are serviced by shared storage system as is expected by the involved parties, such as is determined by service agreements/guarantees entered into for the various parties.

It can be especially difficult to consistently limit I/O resources between multiple workloads accessing shared parallel-access devices, such as flash devices. Managing usage limits on parallel-access devices generally involves monitoring utilization of the devices or launching fixed I/O rates.

The technique of launching fixed I/O rates allocates, to each workload running on shared storage, a fixed number of I/O requests for a particular time interval to achieve a target I/O rate. However, this technique fails to guarantee the same I/O rate for I/O requests of varying size (small or large) and type (read or write). Since a storage device takes more time to process a larger I/O than a small I/O, and also takes more time to accomplish write-type I/O requests when compared to read-type I/O requests, launching fixed I/O rates generally leads to degradation of a small I/O workload by a large I/O workload and also degradation of a read-heavy workload by a write-heavy workload.

Different fixed I/O rate settings may be specified for different kinds of I/O requests, such as small_read_iops, large_read_throughput, small_write_iops, large_write_throughput. However, it is difficult for administrators to properly set up and apply the various settings. Specifically, the existence of the various I/O rate settings implies that the database is able to provide the indicated level of service for all types of I/O requests at the same time, which is not the case because there is generally some degradation of I/O workloads running on a database system due to concurrent servicing of other workloads. Thus, application of the different fixed I/O rate settings for different types of I/O requests generally leads to over-provisioning of system resources and degradation in workload performance when the database system is busy.

Furthermore, at the core of the device-utilization monitoring technique is monitoring a given storage device to determine an average amount of time it takes for the device to service I/O requests. Based on this information, an estimate of the "cost" of a new I/O request may be formulated, where the estimated cost of an I/O request is an estimate of the amount of time that will be spent by the storage device to service the request, excluding any storage device-level queue time. The busyness of a storage device for a given user workload (or the utilization of the workload with respect to the storage device) is the % of time the device has spent servicing the I/O requests, of the workload, during a given time interval. Time that the device has spent in servicing the I/O requests of a given workload may be determined based on multiplying the total number of I/O requests served for the workload with cost estimates for I/O requests that have issued to the storage device.

This technique of monitoring device utilization assumes the busyness of a storage device gives a fixed I/O rate that is proportional to the device's maximum bandwidth. However, while this assumption holds true for storage devices that serve I/O requests sequentially (such as hard disks or memory tape), it does not hold true for parallel-access devices that process I/O requests in parallel. That is, a single I/O request being served by a parallel-access device can make the device 100% busy, notwithstanding the ability of the parallel-access device to handle many more I/O requests in parallel during the same amount of time.

Thus, using the device-utilization monitoring technique to manage usage limits for a parallel-access device results in inconsistent valuation of device busyness (workload utilization), where the valuations are impacted by workload intensity. The workload I/O intensity of a storage device represents the load of concurrent I/O requests submitted to the storage device. Specifically, for a heavy workload running with a high number of concurrent I/O requests, a small value for I/O request cost is observed for a parallel-access device. Further, for a light workload running with a lower number of concurrent I/O request, a relatively large value for I/O request cost is observed for the same parallel device. Therefore, application of the device-utilization monitoring technique for parallel-access devices can result in consistent under-utilization or over-burdening of the devices.

Therefore, there is a need for an improved approach to managing access to parallel-access storage devices by multiple workloads such that I/O resources are consistently limited for workloads utilizing the storage devices, where the parallel-access devices are not consistently under-utilized or over-burdened.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIGS. 2A-2B depict a flowchart for throttling client I/O requests for a parallel-access storage device using a parallel-access based I/O request cost metric.

DETAILED DESCRIPTION

Figure 1:
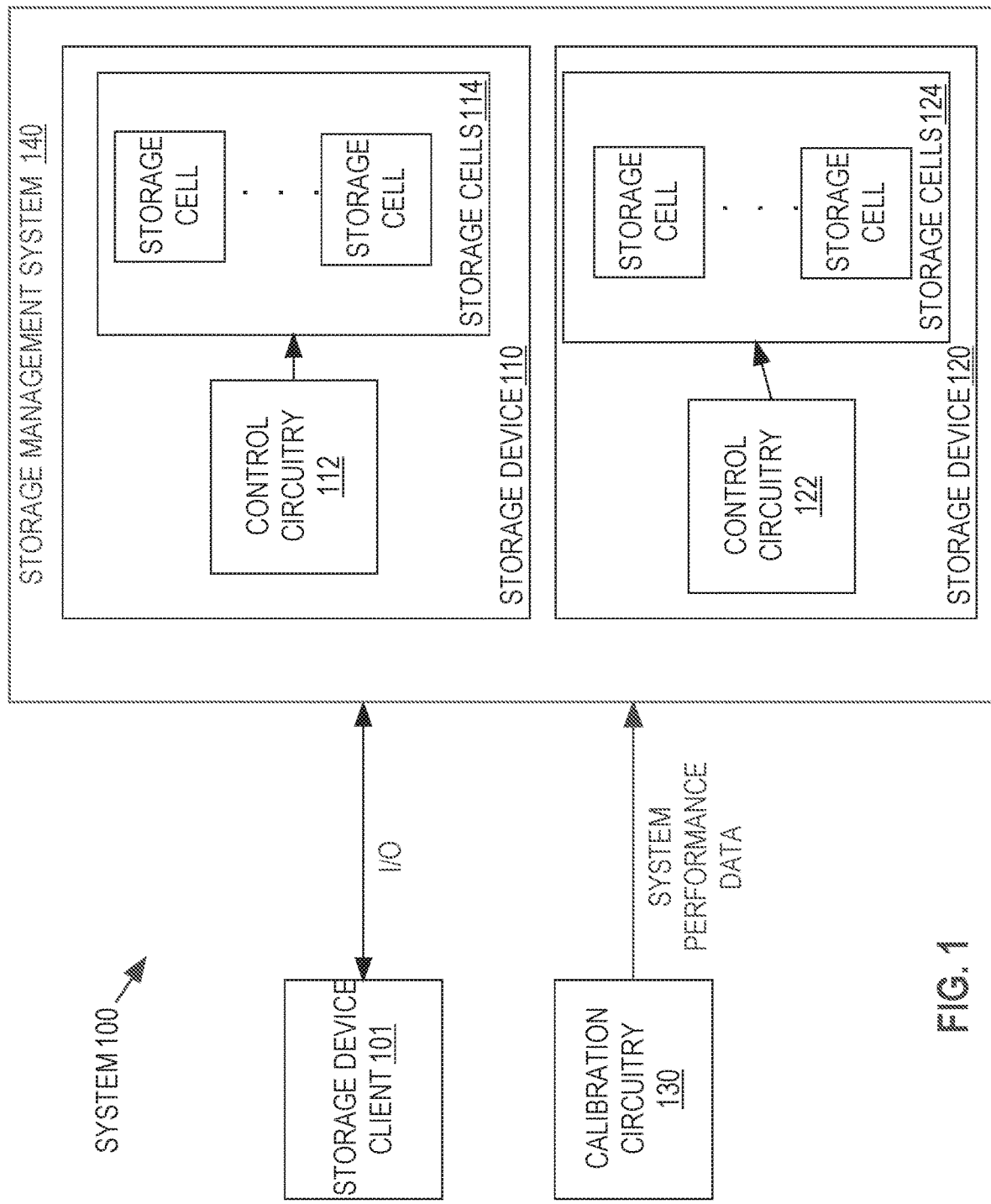
FIG. 1 depicts a storage system that comprises a storage client and storage devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques described herein affect constraints on client utilization of a parallel-access storage device based on a hybrid of monitoring disk utilization and applying fixed I/O rates. Specifically, techniques described herein estimate client utilization of a particular storage device by using one or more I/O cost metrics to estimate the relative costs of I/O requests from the client to the particular storage device. The one or more I/O cost metrics are determined using calibration-based system performance data, which represents a system-wide measure of storage device performance for a system in which the particular storage device resides. The calibration-based system performance data for a given system includes one or both of composite throughput data and composite data that represents a number of I/O requests serviced per second, which composite data represents performance of multiple parallel-access storage devices in the system. Calculating I/O cost metrics in this way allows for consistent valuation of the cost of I/O requests for parallel-access devices.

The cost valuations for I/O requests issued from a client to a parallel-access device are tracked in a total I/O cost value. Client utilization of the storage device, as tracked by the total I/O cost value, is limited to a fixed I/O rate that is a percentage of the total estimated bandwidth of the storage device based on the cost values of I/O requests being derived from the calibration-based system performance data that includes storage device throughput and/or I/O requests serviced per second data. Such techniques allow constraint of client utilization of the parallel-access storage device based on a single utilization constraint factor, i.e., the fixed I/O rate. The single utilization constraint factor is applicable to I/O requests with different attributes, such as size and type. Utilization of a single client constraint factor, such as a single percentage of allocated usage of a storage device, allows a "single knob" to control utilization of the device. This type of control is simple for workload administrators to utilize and monitor, and gives consistent guidance as to the amount of activity at the device that should be allowed for a given client workload.

The ability to place a single utilization limit on workloads, rather than utilizing a variety of I/O request type-specific utilization limits, simplifies limitation of the I/O resources for workloads accessing the resources without respect to the types and sizes of workload I/O requests. Storage system utilization of 100% indicates that the storage system cannot, at present, service any more I/O requests, and any pending I/O requests are queued. Thus, techniques described herein divide storage system resources based on single utilization limits assigned to the various workloads working within the storage system, and also prevents degradation of one workload due to issuance of I/O requests of another workload.

Thus, the techniques described herein guarantee consistent I/O workload performance for clients that access parallel-access storage devices in conjunction with other workloads. This guarantee is especially useful in consolidated and cloud environments, where thousands of tenants are guaranteed particular levels of utilization of I/O resources, and are billed for their system usage.

Limiting I/O Resources on Storage Devices

According to the techniques described herein, embodiments allow consistent constraint of client usage of parallel-access storage devices. As used herein a "storage" device is any storage or memory device (including semiconductor memory) that services I/O requests in parallel, such as flash memory devices, precision memory devices, phase-change memory (PCM), parallel-access persistent memory, parallel random access machine (PRAM), dynamic random access memory (DRAM), static random-access memory, etc.

To illustrate, if a storage device is busy (i.e., actively processing I/O requests) for 500 milliseconds (ms) out of one second, it is said that the device is at 50% utilization. An effective workload constraint technique constrains various workloads that access a particular storage device, based on appropriate client constraint factors, while allowing for 100% utilization of the storage device. The amount of work that can be accomplished by a storage device can be measured in I/O requests per second (IOPS), or in I/O throughput, e.g., in megabytes per second (MBPS). Thus, if a particular client is allocated a 50% limit (client constraint factor) for a given storage device (or group of storage devices), the client can use either 50% of the maximum IOPS for the storage device or 50% of the maximum throughput for the device.

Different clients/workloads have different I/O request requirements. For example, online transactional processing (OLTP) type workloads generally issue many small I/O requests. As another example, data warehouse-type workloads generally scan whole sections of data (such as whole database tables), which are considered to be large I/O requests. Small I/O requests coming into a particular storage device may reference portions of data that are positioned randomly on the storage medium of the device. (Accessing data from sequential-access storage devices and from parallel-access storage devices is described in further detail below.) As such, it may take some time to access the data required for each small I/O request, which affects the amount of work that can be accomplished over time. Thus, when I/O requests are small (e.g., below a particular size threshold), the amount of work being accomplished is generally measured by IOPS.

Conversely, the data required for a large I/O request is generally stored sequentially on the storage medium. As such, a large I/O request may be completed more quickly than several small I/O requests that are, collectively, the same size as the large I/O request. Thus, when I/O requests are large (e.g., above the size threshold), the amount of work being accomplished is generally measured by throughput.

FIG. 1 depicts a storage system 100 on which embodiments may be implemented. According to an embodiment, constraint of client utilization of a storage device, such as storage device 110, is executed by a storage management system 140, of system 100, which manages one or more storage devices in system 100. According to the example system 100 of FIG. 1, storage device client 101 accesses data in storage devices 110 and 120 by issuing I/O requests, potentially in parallel, to storage management system 140, which communicates the I/O requests to one or more of the storage devices managed by system 140. The I/O requests specify respective logical addresses for units of storage being accessed by the requests. Storage management system 140 determines whether a given I/O request should be immediately issued to the respective storage cells, or should be placed in a hold queue, as described in further detail below.

I/O Request Cost

At the heart of client constraint techniques described herein lies computing the "I/O request cost" of an I/O request. This I/O request cost is an estimate of the amount of time that it would take for an I/O request to be processed, and does not include any time spent by an I/O request waiting in a hold queue.

To constrain a particular workload, such as the workload of client 101, to a particular client constraint factor (e.g., 50%) for a given storage device, storage management system 140 determines whether the workload has issued a sufficient number of I/O requests during a current time quantum (such as the current second) to account for the allocated portion of the capacity of the device, as measured during the current time quantum. This determination is based on valuations of the costs of the I/O requests that the client has issued to the storage device during the time quantum. A time quantum is a unit of time during which I/O requests are tracked and constrained according to client constraint factors. The beginning of each new time quantum causes the system to reset the current totals of estimated I/O cost for each client being tracked. Furthermore, the beginning of each new time quantum may also cause the system to update the current I/O cost for a storage device based on the calibrated data for IOPS and throughput for the system.

If a client has issued a sufficient number of I/O requests to account for the allocated portion of the capacity of the storage device, based on the determined I/O request costs, storage management system 140 throttles the I/O requests of the workload, e.g., by queueing I/O requests from the client until the client constraint would not be violated by issuing one or more of the queued I/O requests. Below, techniques for computing I/O request cost for sequential-access storage devices are first discussed. After, techniques for computing I/O request cost for parallel-access storage devices are discussed, according to one or more embodiments.

I/O Request Cost Metric—Sequential-Access Storage Devices

A sequential-access storage device (such as a disk array, a hard disk, a magnetic tape data store, etc.) stores information in particular physical areas of the storage medium of the device. To read particular data from the storage medium, a data reader device is physically moved to the area of the storage medium on which the data is stored. Thus, at any time, the sequential-access storage device services a single I/O request while any other pending I/O requests wait in the device queue. For example, a disk drive is a sequential-access storage device that locates data on tracks and sectors of a circular disk. To access particular data stored on the disk, the disk spins to position the pertinent sector of the disk under a data reader device. A moveable arm moves the data reader device to the track on which the data is stored within the sector. In this way, the data reader head sequentially retrieves the data for each I/O request issued to the disk. A sequential-access storage device may implement an optimization comprising rearranging the order of requests being serviced in order to minimize the travel time between data reads/writes, but such techniques are limited to the physical capabilities of the storage device, i.e., only one action may be performed at a time.

To facilitate constraint of client usage of a sequential-access storage device, as described above, an I/O cost metric for the storage device is calculated, which is used to estimate the respective costs of I/O requests issued to the storage device. The I/O cost metric for a given sequential-access storage device is determined based on historical usage data for the device. Specifically, historical data is maintained, where the historical data indicates a historical amount of busy time for a device and a number of I/O requests issued to the device during that busy time. The I/O cost metric is determined from the historical data by dividing the total busy time tracked for the device by the number of I/O requests that were served by the device during that time. An I/O cost metric that results from such a calculation is referred to herein as a "sequential-access based (SAB) cost metric".

According to an example, a particular storage device in system 100 (not depicted in FIG. 1) is a sequential-access storage device. When the sequential-access storage device has no queued I/O requests, storage device client 101 issues a known number of I/O requests to the sequential-access storage device. A storage management system for the sequential-access storage device tracks, in historical data, both the number of I/O requests issued to the storage device and an amount of busy time during which the device serviced the I/O requests. The storage management system determines an SAB cost metric for the sequential-access storage device by measuring the amount of time that the sequential-access storage device took to service the I/O requests divided by the number of I/O requests that were issued to the sequential-access storage device during that time.

Based on the SAB cost metric determined for the sequential-access storage device, the storage management system determines the percentage of utilization for a given client that accesses the storage device. Specifically, the storage management system multiplies a number of I/O requests issued by the client to the storage device during a particular current time quantum (e.g., one second) by the determined SAB cost metric to identify a valuation of the total amount of time that the client kept the sequential-access storage device busy (or occupied) during that time quantum. The percentage utilization for the client is the total amount of time that the client occupied the sequential-access storage device (during the current time quantum) divided by the amount of time that has passed for the time quantum.

For example, the storage management system determines that the sequential-access storage device has an SAB cost metric of 5 milliseconds (ms) based on the busy time of the storage device as described above. Client 101 sends 50 small (requests for less than a threshold amount of data, e.g., 64 kilobytes (KB)) read-type I/O requests to the sequential-access storage device during the first 500 ms of the current time quantum. In this scenario, the storage management system determines that, at 500 ms into the current time quantum, client 101 has utilized the following percentage of the capacity of the sequential-access storage device: 50 I/O requests*5 ms/request=250 ms of time occupied by client 101; 250 ms/500 ms=50% utilization. Examples herein utilize an example threshold of 64 KB for large vs small I/O requests. However, this threshold value is an illustrative example and embodiments may employ any other threshold value, such as 8 KB.

I/O Request Cost Metric—Parallel-Access Storage Devices

In contrast with sequential-access storage devices, parallel-access storage devices are able to service multiple I/O requests in parallel. For parallel-access storage devices, there is no physical data reader to be moved over portions of a storage medium. Instead, the controller for the storage device, such as control circuitry 112 and 122, directly pulls data (such as blocks, e.g., 8 bytes, or pages, e.g., 8 kilobytes) from parallel-access storage cells, as described in further detail below.

Because multiple I/O requests can be serviced by a parallel-access storage device in parallel, SAB cost metric calculation, as described above, does not result in a reliable estimate of the amount of time a given I/O request will take to be serviced by a parallel-access storage device. Specifically, the method of calculating an SAB cost metric assumes that a single I/O request to a parallel-access storage device takes 100% of the capacity of the storage device during the time that it is being serviced. However, the parallel-access device could potentially service many more I/O requests during that time without additional "cost". Thus, an SAB cost metric, which is based on historical data indicating busy time of a device and a number of I/O requests processed over a given amount of time, will vary based on the intensity of the workload during the historical time period. Such a metric is not a reliable indicator of the amount of time future I/O requests will take.

For example, a given parallel-access device with a low-intensity workload processes one I/O request in a millisecond (ms), resulting in an SAB cost metric of one ms. The same parallel-access device handling a high-intensity workload processes four I/O request in one ms, resulting in an SAB cost metric of 0.25 ms. Thus, the previously-calculated SAB cost metric for the parallel-access device over-estimated the I/O request cost for a single I/O request, and there is no guarantee that the second SAB cost metric does not do the same. Relying on such inconsistent SAB cost metrics for a parallel-access device generally causes inconsistent throttling of workloads that submit I/O requests to the parallel-access device, and also generally causes the parallel-access device to run at less-than-full capacity.

Thus, techniques for accurately and consistently calculating an I/O request cost for parallel-access devices are described herein. Resulting I/O request costs are used to accurately and reliably constrain workload-specific utilization of parallel-access storage devices.

Calibration-Based System Performance Data

According to one or more embodiments, a parallel-access based I/O request cost metric ("PAB cost metric") is computed from calibration-based system performance data for a computing system that includes the one or more parallel-access storage devices being managed (such as system 100 that includes parallel-access storage devices 110 and 120). In the following examples, both storage device 110 and storage device 120 represent parallel-access devices. For example, calibration-based system performance data is maintained for system 100 that includes a maximum IOPS and/or a maximum throughput that has been measured for the system, which includes a set of parallel-access devices including storage device 110 and storage device 120. The maximum IOPS and/or the maximum throughput data in the calibration-based system performance data are aggregate figures because they represent the total measured IOPS and/or total measured throughput, respectively, of multiple parallel-access storage devices.

According to an embodiment, the calibration-based system performance data for a system reflects the capabilities of the set of parallel-access devices, in the system, given any limitations imposed by the system. As such, the calibration-based system performance data may not reflect the full capacity of the parallel-access storage devices, i.e., due to system limitations such as processor limitations, software limitations (such as mutex contention), and/or network bandwidth limitations.

For example, calibration circuitry 130 (FIG. 1) is a monitoring client that performs a calibration on system 100 by running one or more test workloads on system 100 (including on storage devices 110 and 120). Based on measurements taken during/after running the test workloads on system 100, calibration circuitry 130 records calibration-based system performance data, for system 100, that includes a maximum IOPS for system 100, and a maximum throughput for system 100, etc. According to an embodiment, calibration circuitry 130 is controlled by or included in storage management system 140. According to an embodiment, the one or more test workloads are optimized to result in parallel accesses in one or both of storage devices 110 and 120 (in addition to any other storage devices in system 100 not shown in FIG. 1).

According to an embodiment, calibration circuitry 130 records the system performance data in a hardware datasheet for system 100 and/or provides the system performance data to storage management system 140, as depicted in FIG. 1. Further, the calibration circuitry 130 may be part of storage management system 140.

Example Implementation of Client I/O Constraint Using Parallel-Access Based I/O Request Cost Metric The calibration-based system performance data for a system is used to calculate one or more PAB I/O cost metrics, which are then used to accurately throttle workloads that utilize the parallel-access devices of the system while allowing the parallel-access storage devices to function at the capacity allowed by the system (as reflected in the calibration-based system performance data). Utilizing the system performance data to calculate I/O request cost valuations for parallel-access storage devices allows for workload throttling that is independent of workload intensity or device configurations, such as RAID configurations. To the end user, a contracted X % constraint factor for a workload calculated based on PAB cost metrics results in the workload being allowed to use X % of the known maximum IOPS or maximum throughput for the parallel-access devices of the system. Furthermore, utilization of calibration-based system performance data for a system, rather than dynamically determining the latest throughput or IOPS for a device based on recent historical data, saves the system processing power by not requiring the consistent dynamic I/O cost metric calculations as is required for SAB cost metrics.

Figure 2B:
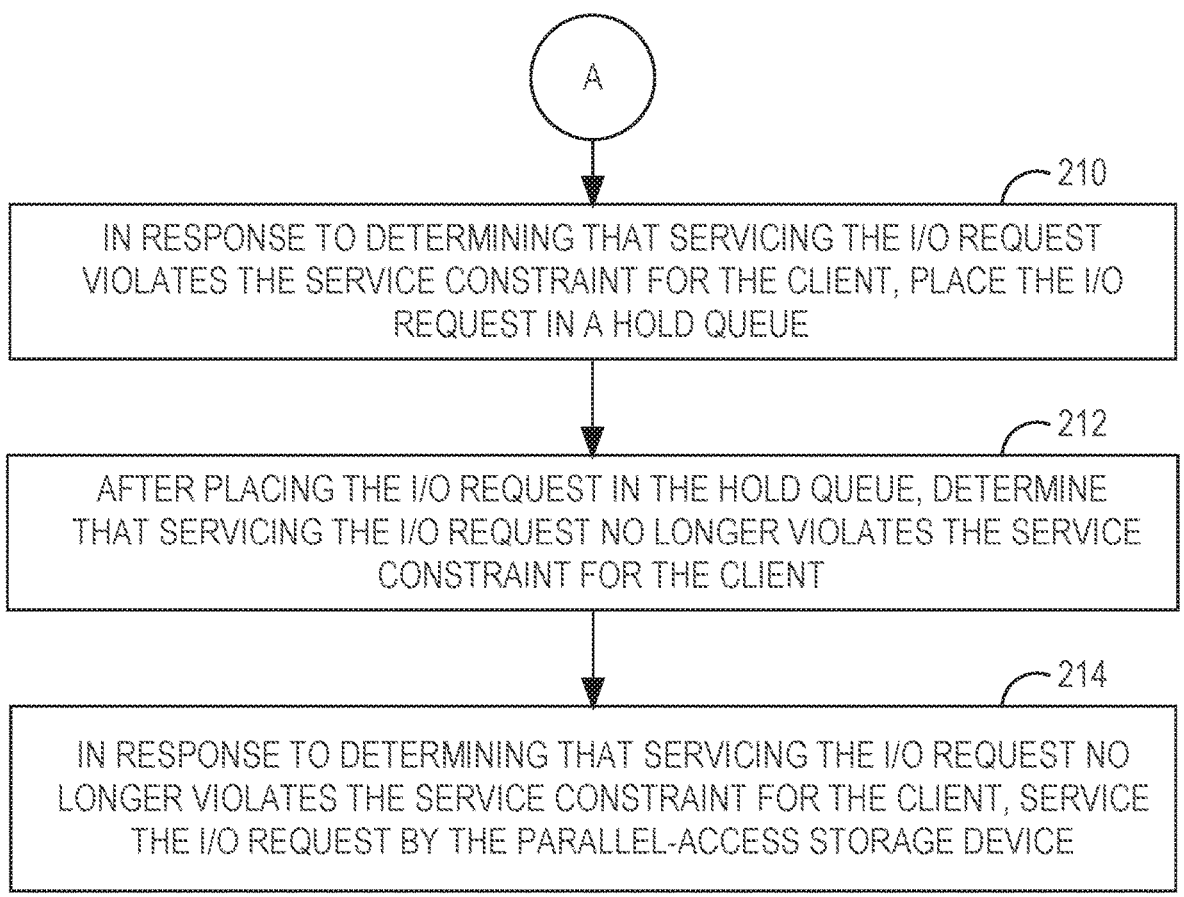
Figure 3:
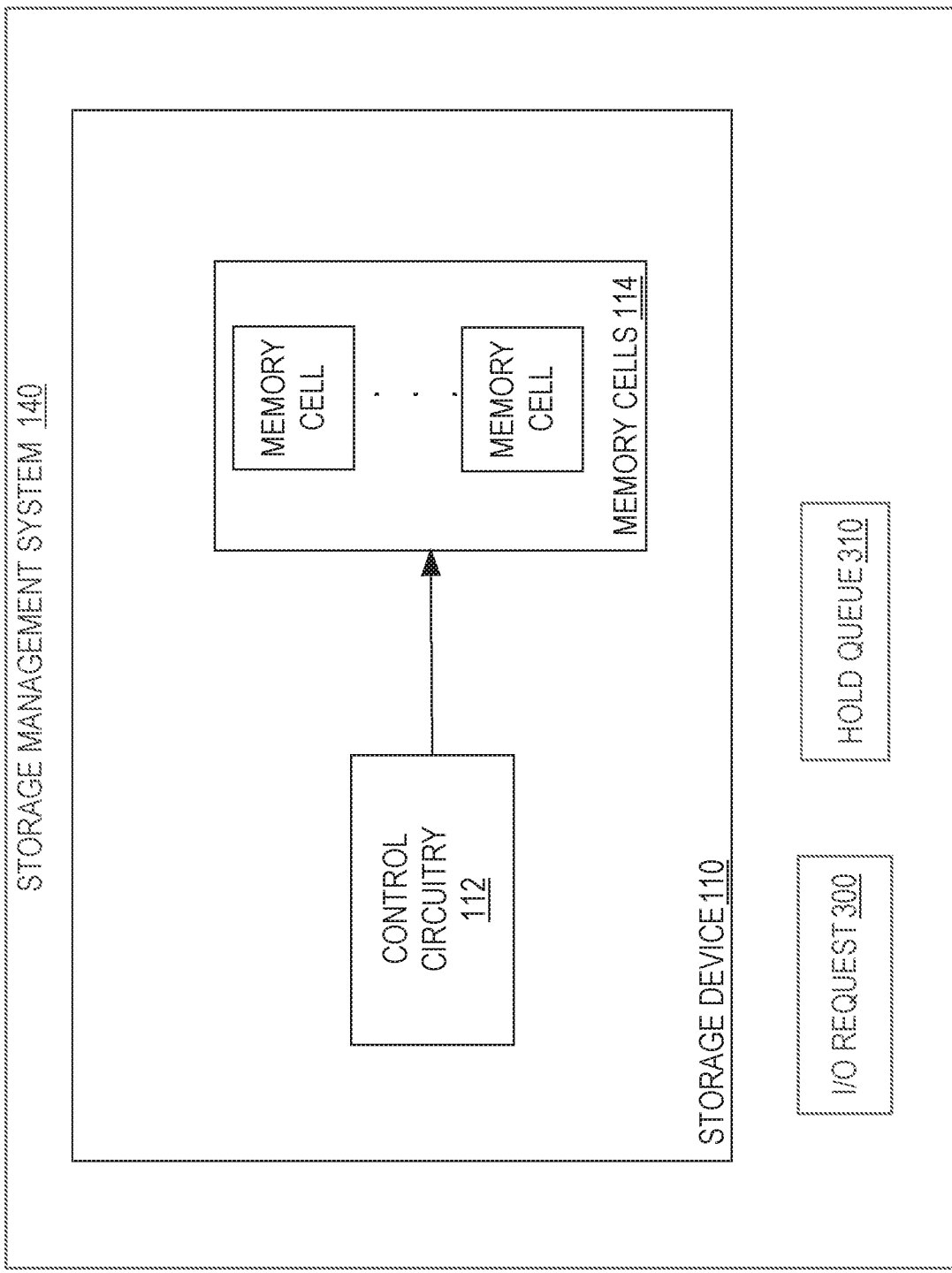
FIG. 3 is a block diagram of a storage device.

The maximum IOPS and/or maximum throughput of the calibration-based system performance data may change occasionally, e.g., because of addition of network bandwidth and/or addition of processor capacity to the system. Thus, according to an embodiment, storage management system 140 is automatically provided access to updated calibration-based system performance data, as described above, and the updated data is automatically applied in calculating PAB cost metrics FIGS. 2A-2B depict a flowchart 200 for throttling client I/O requests to a parallel-access storage device using a PAB I/O request cost metric described above, according to an embodiment. Specifically, at step 202, an I/O request is received from a client, wherein the I/O request requests data from a parallel-access storage device. For example, as depicted in FIG. 3, client 101 sends an I/O request 300 for a read-type I/O at parallel-access storage device 110 to storage management system 140. FIG. 3 depicts storage device 110 at a point in time after I/O request 300 is received by storage management system 140 from client 101 (where reference numbers shared by FIG. 1 and FIG. 3 refer to the same entities).

At step 204 of flowchart 200, it is determined whether servicing the I/O request violates a service constraint for the client, where the service constraint constrains use of the parallel-access storage device, by the client, based on device utilization. For example, client 101 is constrained to 40% utilization of parallel-access storage device 110. Continuing with the example of step 202, storage management system 140 determines whether servicing I/O request 300 received from client 101 would violate the 40% service constraint for the client workload on storage device 110. According to an embodiment, determining whether servicing the I/O request violates a service constraint for the client comprises steps 206-208 of flowchart 200.

I/O Cost Metrics

At step 206 of flowchart 200, an estimated cost for the I/O request is determined based, at least in part, on an I/O cost metric that is based on calibration-based system performance data for a computing system that includes the parallel-access storage device. For example, storage management system 140 estimates a cost for I/O request 300 based on a PAB I/O cost metric for parallel-access storage device 110 that is calculated based on calibration-based system performance data for system 100, e.g., provided by calibration circuitry 130 as described above.

According to an embodiment, storage management system 140 calculates, for storage device 110, one or both of (a) an IOPS-based PAB cost metric, and (b) a throughput-based PAB cost metric. To illustrate, the system performance data for system 100 indicates that the maximum IOPS for system 100 (including both storage device 110 and storage device 120) is 5 million IOPS, and the maximum throughput for system 100 is 500 MBPS or 500,000 kilobytes per second (KBPS). In this example, the number of storage devices in system 100 is two. As such, storage management system 140 determines an IOPS-based PAB cost metric as follows (with the pertinent time quantum being 1 second, i.e., 1,000,000,000 nanoseconds): (1,000,000,000 nanoseconds)/(5,000,000 IOPS/2 parallel-access devices)=400 nanoseconds per I/O request.

According to an embodiment, a throughput-based PAB cost metric is calculated based, at least in part, on a valuation of the size of an I/O request. For example, a throughput-based PAB cost metric is computed for an I/O request size of 64 KB. In this example, storage management system 140 determines a throughput-based PAB cost metric for system 100 as follows: (1,000,000,000 nanoseconds)/((500,000 KBPS/64 KB)/2 parallel-access devices)=256 microseconds per I/O request.

Using PAB Cost Metrics to Estimate I/O Request Costs

Returning to the explanation of step 206 of flowchart 200, an estimated cost for I/O request 300 is determined based, at least in part, on a calculated I/O cost metric. For example, storage management system 140 uses one of a plurality of PAB cost metrics maintained in memory by storage management system 140, including the IOPS-based PAB cost metric (400 nanoseconds per I/O request) and the throughput-based PAB cost metric (256 microseconds per I/O request), to estimate the cost of I/O request 300.

According to an embodiment, one or more attributes of the I/O request (such as size, type, the potential for the I/O request to be fragmented by the storage device, etc.) are used to select an appropriate PAB cost metric, of the plurality of PAB cost metrics maintained in memory by storage management system 140, and, if needed, to scale the identified PAB cost metric to generate a valuation the cost of the request. For example, if I/O request 300 received from client 101 is for data that is less than a threshold size (such as 64 KB), storage management system 140 automatically estimates the I/O request cost for I/O request 300 using the IOPS-based PAB cost metric. I/O requests that are for data that is less than the threshold size are referred to herein as "small" I/O requests. In this example, using the example IOPS-based PAB cost metric of 400 nanoseconds per I/O request, in response to determining that the received I/O request is a small I/O request, circuitry 112 automatically estimates the I/O request cost for the I/O request to be 400 nanoseconds.

According to an embodiment, the type of the small I/O request is used to scale the IOPS-based PAB cost metric to generate an estimate of the cost of the I/O request. For example, the cost of a read-type small I/O request is estimated to be the IOPS-based PAB cost metric with a scale of one (or unadjusted). As a further example, a write-type small I/O request is estimated to be the IOPS-based PAB cost metric with a scale of 1.5. The scaled PAB cost metric may be maintained, in memory, by storage management system 140 or may be calculated on the fly, for example, when PAB cost metric scaling factors are configurable numbers.

As a further example, if I/O request 300 received from client 101 is for data that is greater than the threshold size, storage management system 140 automatically estimates the I/O request cost for the I/O request using a throughput-based PAB cost metric. I/O requests that are for data that is greater than the threshold size are referred to herein as "large" I/O requests. In this example, using the example throughput-based PAB cost metric of 256 microseconds per I/O request, in response to determining that the received I/O request is a large I/O request, circuitry 112 automatically estimates the I/O request cost for the I/O request to be 256 microseconds (with a scaling factor of one).

According to one or more embodiments, the throughput-based PAB cost metric, and/or the IOPS-based PAB cost metric, is scaled based on a known size of a given I/O request to generate a valuation of the cost of the I/O request. For example, I/O request 300 requests data with a size of 1.5 MB. In this example, storage management system 140 scales the throughput-based PAB cost metric to generate a valuation of the cost of I/O request 300 as follows: 256 microseconds*(1.5 MB/64 KB)=6,144 microseconds.

According to an embodiment, scaling of the throughput-based PAB cost metric is performed by tiers of I/O request size. Specifically, if a size of the I/O request falls within a particular tier, which is defined by two threshold I/O request sizes, of a set of graduated threshold I/O request sizes (for example, 64 KB, 128 KB, 256 KB, 512 KB, 1 MB, 2 MB, etc.), the throughput-based PAB cost metric is scaled to the lower of the two thresholds for the particular tier to generate the valuation of the I/O request cost. According to an embodiment, the scaled PAB cost metrics corresponding to each tier is maintained, in memory, by storage management system 140. Thus, calculation of the scaled PAB cost metrics for each tier need not be calculated each time the respective cost metrics are needed to estimate the cost of an I/O request that falls within the associated tier.

To illustrate tiered scaling, I/O request 300 is for data that is 75 KB. Thus, the I/O request falls between the following size thresholds of the example graduated set indicated above: 64 KB and 128 KB. Given that the throughput-based PAB cost metric is already based on 64 KB and the lower of the two thresholds is 64 KB, no scaling is required to generate the valuation of the I/O request cost, i.e., the estimated cost of I/O request 300 is 256 microseconds.

As a further example, I/O request 300 is for data that is 800 KB. Thus, the I/O request falls between the following size thresholds of the example graduated set: 512 KB and 1 MB. To generate an estimate of the cost of I/O request 300, the throughput-based PAB cost metric is scaled to 512 KB as follows: 256 microseconds*(512 KB/64 KB)=2,048 microseconds. Again, this scaled PAB I/O cost metric (as with any scaled PAB cost metric) may be retrieved from memory or disk as opposed to being calculated on the fly.

According to one or more embodiments, large read-type I/O requests are treated differently from large write-type I/O requests. For example, the estimated cost for a large read-type I/O request is determined as indicated above.

According to an embodiment, the estimated cost for a large write-type I/O request is as indicated above with a scale of 1.5 applied to the throughput-based PAB cost metric. For example, I/O request 300 is to write data that is 800 KB. Thus, the I/O request falls between the following size thresholds of the example graduated set: 512 KB and 1 MB. To generate an estimate of the cost of write-type I/O request 300, according to this embodiment, the throughput-based PAB cost metric is scaled to 512 KB as follows: 256 microseconds*(512 KB/64 KB)=2,048 microseconds. The resulting metric is further scaled by 1.5 to generate the estimate of the cost of I/O request 300 as follows: 2,048 microseconds*1.5=3,072 microseconds.

According to another embodiment, the throughput-based PAB cost metric used to estimate the cost of a large write-type I/O request is scaled to the higher of the two thresholds for the particular tier to generate the estimate of the write-type I/O request cost. To illustrate this embodiment, I/O request 300 is to write data that is 800 KB. The size of the I/O request falls between 512 KB and 1 MB. Thus, to generate an estimate of the cost of I/O request 300, the throughput-based PAB cost metric is scaled to 1 MB (the higher of the two thresholds for the applicable tier) as follows: 256 microseconds*(1,024 KB/64 KB)=4,096 microseconds.

Determining whether an I/O Request Violates a Service Constraint Using a PAB Cost Metric At step 208 of flowchart 200, it is determined whether a total estimated cost of I/O requests for the client exceeds a total cost limit for the client, where the total estimated cost of I/O requests for the client comprises the estimated cost for the I/O request and any estimated costs for any other I/O requests issued for the client during a current time quantum, and where the total cost limit for the client is based, at least in part, on the service constraint. For example, storage management system 140 tracks, from the beginning of a time quantum (e.g., the current second), a total estimated cost of I/O requests issued to storage cells 114 for each individual client including client 101. Storage management system 140 determines whether the total estimated cost for a given client represents the percentage, allocated to the client (e.g., 40%), of the time lapsed for the current time quantum.

To illustrate, during the current time quantum, storage management system 140 has issued (a) 200 small read I/O requests, and (b) one large write-type I/O request with the size of 1.5 MB from client 101 to storage cells 114. The example PAB cost metric for small read I/O requests is 400 nanoseconds per I/O request. In this example, tiered throughput-type PAB cost metrics are used, where a write request is estimated based on the higher of the two delineators of the tier associated with the request. Thus, the example PAB cost metric for the large write-type I/O request with a size of 1.5 MB is the example throughput-based PAB cost metric (256 microseconds) from the previous example scaled to 2 MB as follows: 256 microseconds*(2 MB/64 KB)=8,192 microseconds. As such, storage management system 140 maintains a value for the current total estimated cost of I/O requests for client 101 as follows: 200 I/O requests*400 nanoseconds per I/O request+1 I/O request*8,192 microseconds=8,272 microseconds. As such, storage management system 140 maintains, in memory, 8,272 microseconds as the total estimated cost of I/O requests from client 101 during the current time quantum.

At 21,000 microseconds into the current time quantum, client 101 issues, to storage device 110, a large read-type I/O request 300 (see FIG. 3) with the size of 1.5 MB. Continuing with the tier-based cost metric paradigm used above, an estimate of the cost of the large read-type I/O request 300 is the example throughput PAB cost metric for large I/O requests (256 microseconds) scaled to the lower of the delineators of the tier associated with the size of I/O request 300 (1 MB) as follows: 256 microseconds*(1 MB/64 KB)=4,096 microseconds.

If I/O request 300 were immediately issued to storage cells 114 at time 21,000 microseconds (from the start of the current time quantum), the total estimated I/O request cost for client 101 during the current time quantum would be 12,368 microseconds, which would account for 49.28% of the time that will have passed for the current time quantum (taking into account the time that had passed when I/O request 300 was received and the amount of time I/O request 300 would take to run i.e., 21,000 microseconds+4,096 microseconds=25,096 microseconds). Thus, storage management system 140 determines that the total estimated cost of I/O requests for client 101 (12,368 microseconds) exceeds a total cost limit for the client (i.e., 40% of 25,096 microseconds=10,038.4 microseconds).

According to another embodiment, the calculation of the amount of time that has passed for the current quantum does not factor in the time for the I/O request itself. In this embodiment, if I/O request 300 were immediately issued to storage cells 114 at time 21,000 microseconds (from the start of the current time quantum), the total estimated I/O request cost for client 101 during the current time quantum would be 12,368 microseconds, which would account for 58.90% of the time that has passed for the current time quantum. Thus, storage management system 140 determines that the total estimated cost of I/O requests for client 101 (12,368 microseconds) exceeds a total cost limit for the client (i.e., 40% of 25,096 microseconds=10,038.4 microseconds).

Limiting the usage of clients based on the amount of time that has passed during a given time quantum results in I/O requests from the clients being spread out across the time quantum. In this way, storage cells 114 are not overloaded with a spike of I/O requests at the beginning of the time quantum, which may be the case if client 101 had 400,000 microseconds (which is 40% of 1,000,000 microseconds) worth of I/O requests ready to issue at the beginning of the time quantum, and the quota was only compared to the entire time quantum rather than to the portion of the time quantum that has already passed.

Throttling Client Usage of Parallel-Access Devices Using Estimated I/O Request Cost At step 210 of flowchart 200, in response to determining that servicing the I/O request violates the service constraint for the client, the I/O request is placed in a hold queue. Continuing with the above example, in response to determining that large read-type I/O request 300 from client 101 would cause the total estimated cost of I/O requests from that client to exceed the total cost limit during the current time quantum, storage management system 140 automatically places I/O request 300 in a hold queue 310 (FIG. 3). According to an embodiment, hold queue 310 is specific to client 101, and holds I/O requests from client 101 that have been put on hold due to throttling. According to another embodiment, hold queue 310 includes I/O requests from multiple clients.

At step 212 of flowchart 200, after placing the I/O request in the hold queue, it is determined that servicing the I/O request no longer violates the service constraint for the client. For example, storage management system 140 determines a time at which issuance of I/O request 300 would not cause the total estimated I/O cost for client 101 to exceed the 40% limit on client 101. Specifically, issuance of I/O request 300, with an estimated cost of 4,096 microseconds, would bring the total estimated cost of I/O requests for client 101 to 12,368 microseconds. Thus, the amount of time from the beginning of the current time quantum that must pass in order for the total estimated cost of I/O requests for client 101 (with I/O request 300) to account for no more than 40% of the time would be 12,368 microseconds/40%=30,920 microseconds. Thus, storage management system 140 determines that I/O request 300 in hold queue 310 may be issued after the following amount of time has passed from the beginning of the time quantum: 30,920 microseconds−4,096 microseconds=26,824 microseconds. As such, when storage management system 140 determines that at least 26,824 microseconds has passed from the beginning of the current time quantum, issuance of I/O request 300 in hold queue 310 would no longer violate the 40% limit on client 101.

At step 214 of flowchart 200, in response to determining that servicing the I/O request no longer violates the service constraint for the client, the I/O request is serviced by the parallel-access storage device. For example, in response to determining that the total estimated cost of I/O requests for client 101 (including the estimated cost of I/O request 300) issued during the current quantum would not exceed the total cost limit for the client (i.e., at 26,824 microseconds from the beginning of the current time quantum), storage management system 140 issues I/O request 300 to one of the storage devices being managed by system 140, e.g., storage device 110, and adds the estimated cost of I/O request 300 to the total estimated I/O cost maintained, in memory, for client 101 with respect to one or more of the storage devices. The estimated costs maintained for a given client may pertain to a single storage device or to multiple storage devices.

Illustrative Storage Device System

FIG. 1 depicts a storage system 100. A storage system comprises one or more storage clients that issue I/O requests to one or more storage devices to access a unit of storage at one or more logical addresses specified in the requests. Storage system 100 comprises at least storage device client 101, storage device 110, storage device 120, and a storage management system 140 that manages storage devices 110 and 120. In the example of FIG. 1, system 100 further includes calibration circuitry 130. System 100 may comprise one or more other storage device clients (other than client 101), which are not depicted in FIG. 1.

Storage device client 101 is a computing device comprising one or more processors and a memory and/or disk. Computing devices include, without limitation, computer systems, such as a personal computer, server, server blade, mobile smart phone, game device, or a television system. Storage device 110 and storage device 120 are each example storage devices comprising storage media (e.g., storage cells) and control circuitry for accessing and managing data stored in the storage media. Example storage device 110 comprises control circuitry 112 and storage cells 114. Example storage device 120 comprises control circuitry 122 and storage cells 124.

Storage management system 140 is a system that manages I/O requests being submitted to the storage devices of system 100. According to embodiments described herein, storage management system 140 constrains the utilization of workloads regarding the storage devices of the system. A non-limiting example storage management system is Oracle Exadata Storage Server. (Additional information on Oracle Exadata Storage Server is found in "A Technical Overview of the Oracle Exadata Database Machine and Exadata Storage Server", Oracle White Paper, June 2012, and in "Oracle Exadata Database Machine X8-2", Oracle Data Sheet, copyright 2017, the entire contents of each of which are hereby incorporated as if fully set forth herein).

Control circuitry, such as control circuitry 112 and 122, is circuitry for accessing and storing data on the storage media of a storage device. Control circuitry performs various functions, which include, without limitation, processing and/or responding to I/O requests from storage device clients to read and write data to storage media, error detection, encryption, address mapping, and compression. Control circuitry may comprise one or more processors, one or more controllers, memory, and registers. The various functions of control circuitry are performed by hard-wire circuitry, by processor execution of software instructions, or a combination thereof.

A storage device client, such as storage device client 101, accesses data in a storage device by issuing I/O requests to the storage device that specify respective logical addresses for units of storage to access. According to an embodiment, a unit of storage that is accessed and referenced by a logical address is referred to herein as one or more of: a memory block or simply a block, or a memory page or simply a page.

According to an embodiment, to access a storage unit, control circuitry determines the physical address corresponding to a logical address specified in the I/O request. According to an embodiment, control circuitry maintains, in memory, mapping data that maps logical storage addresses to physical addresses. Control circuitry may maintain a hold queue and implement I/O scheduling techniques, which are distinct from I/O scheduling techniques and hold queues described herein in connection with storage management system 140.

According to an embodiment, storage cells 114 and 124 are parallel-access storage cells (such as flash storage cells), and, accordingly, storage devices 110 and 120 are parallel-access storage devices. There are two main types of flash parallel-access storage devices: NAND storage devices and NOR storage devices. One main difference between these types of flash parallel-access storage devices is the manner of accessing the stored data. Also, NAND storage devices generally have higher storage capacity than NOR storage devices. A flash parallel-access storage cell may be implemented as a NAND storage cell, although other parallel-access storage technologies can be used according to embodiments.

A parallel-access storage cell can be a single storage die or multiple storage dies. In an embodiment, a parallel-access storage device may comprise only one storage cell that is a single storage die. In such embodiments, control circuitry 112 and 122 may perform write wear balancing and process I/O requests to erase data from parallel-access storage cells 114 and 124.

According to one or more embodiments in which storage devices 110 and 120 are parallel-access storage devices, storage devices 110 and 120 are each capable of processing and responding to I/O requests (read or write) in parallel. In such embodiments, multiple processes running on a storage device client of one these parallel-access storage devices, such as storage device client 101, issue I/O requests to the parallel-access storage device via storage management system 140. These I/O requests are received and/or processed in parallel by the parallel-access storage device.

In addition, I/O requests by storage device client 101 may be queued, in a storage device-specific hold queue, by the control circuitry of the parallel-access storage devices. Subsets of the queued I/O requests may be processed in parallel. If, after processing a subset of I/O requests, other I/O requests are queued, then some or all of the other I/O requests may be processed in parallel. According to one or more embodiments, storage devices 110 and 120 are of different types of parallel-access storage devices, types of which include flash memory devices, precision memory devices, phase-change memory (PCM), parallel-access persistent memory, parallel random access machine (PRAM), dynamic random access memory (DRAM), static random-access memory.

According to an embodiment, a parallel-access storage device may comprise multiple chips to service I/O requests in parallel to increase the overall potential bandwidth of the device. These chips maintain data on respective parallel-access storage media (e.g., storage cells 114 and 124), which serve the data requests. In this embodiment, the device controller issues I/O requests in parallel to multiple chips and parallel-access storage media to achieve high parallelism. Furthermore, a parallel-access storage device may be comprised of multiple sequential-access storage devices being controlled jointly so as to allow a client to submit multiple I/O requests to the controller and have the controller use the multiple sequential-access storage devices to satisfy the I/O requests in parallel.

Furthermore, calibration circuitry 130 is circuitry determining calibration-based system performance data for system 100, as described in detail above. Calibration circuitry may comprise one or more processors, one or more controllers, memory, and registers. The various functions of control circuitry are performed by hard-wire circuitry, by processor execution of software instructions, or a combination thereof.

Any of the functionality attributed to client 101, control circuitry 112, control circuitry 122, or calibration circuitry 130 herein may be performed by any other entity, which may or may not be depicted in system 100 of FIG. 1, according to one or more embodiments. In one or more embodiments, each of the processes and/or functionality described herein are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory and/or storage of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
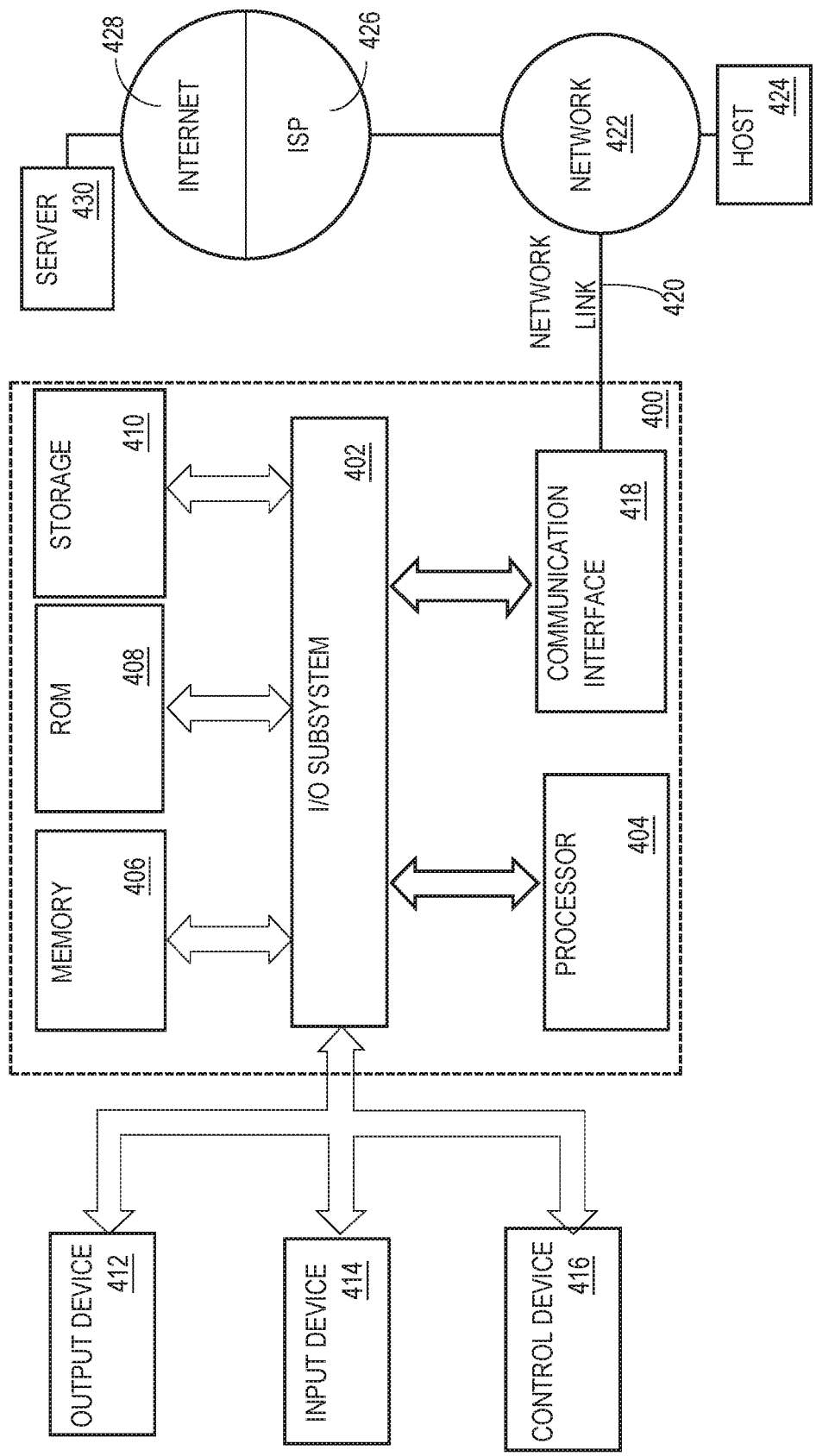
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

In some embodiments, co-processors may reside on the same chip as hardware processors or processor cores. Examples of such co-processors include a data analytics accelerator (DAX) co-processor and a single instruction, multiple data (SIMD) processor.

A DAX co-processor enables database operations to run directly in the co-processor while hardware processor cores execute other instructions. Such operations include (1) scanning an array for elements which match (or greater than or less than) an input value and returning a bit vector with bits set for matches; (2) selecting elements from an array based on a bit vector; and (3) in set operation, given an input set of integers, determining how many of them are also present in another set.

SIMD processors perform the same operation on multiple data items simultaneously. SIMD processors exploit data level parallelism by executing a single instruction against data in multiple registers or subregisters. Thus, the throughput per instruction may be increased accordingly.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
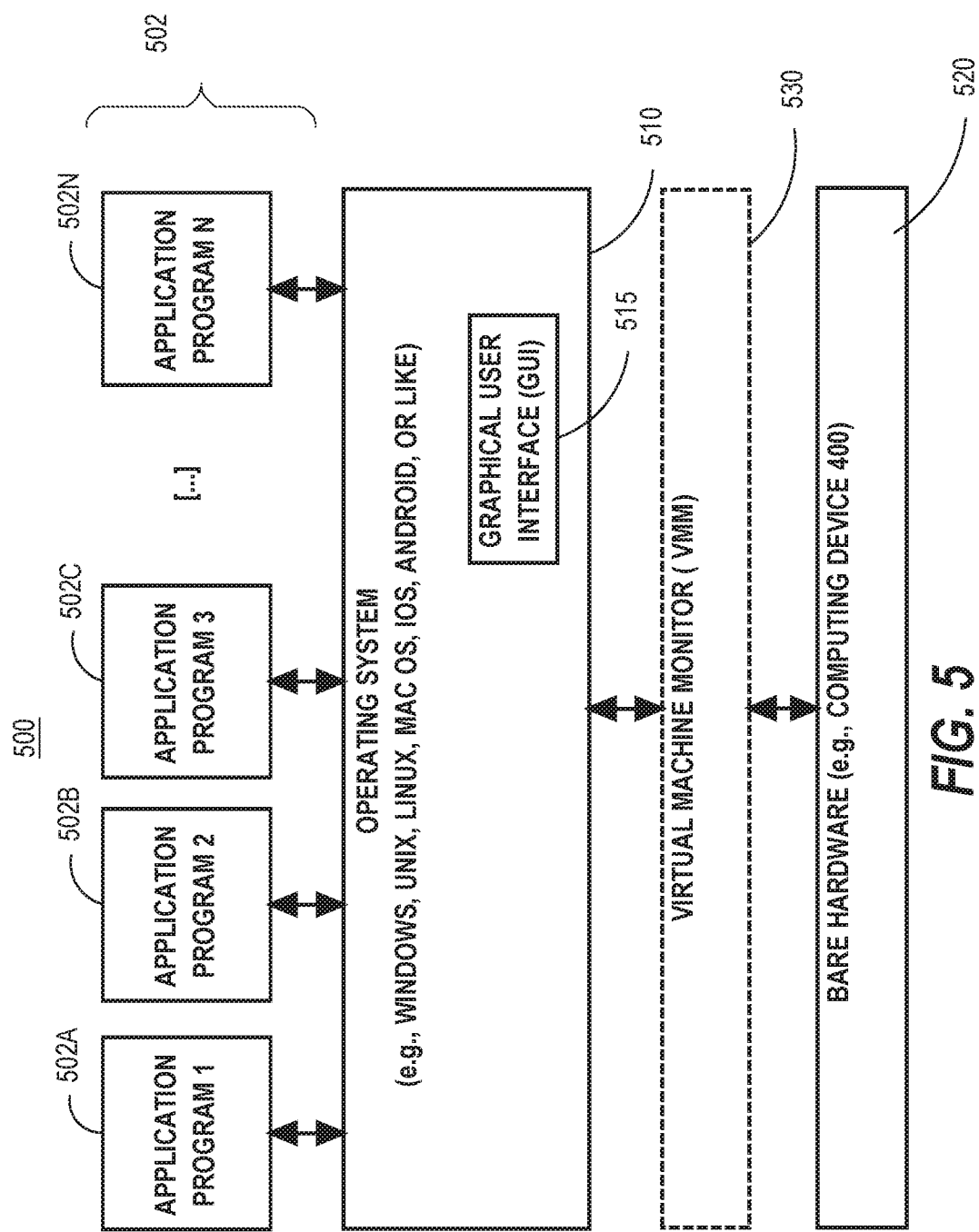
FIG. 5 depicts a software system that may be used in an embodiment.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   detecting performance data for a plurality of storage devices of a computing system, the plurality of storage devices comprising a parallel-access storage device;
   based on the detected performance data for the plurality of storage devices, determining one or more calibration-based system performance metrics measuring performance of the plurality of storage devices;
   wherein each calibration-based system performance metric, of the one or more calibration-based system performance metrics, is a throughput metric or an I/O per second (IOPS) metric;
   receiving an I/O request from a client, of a plurality of clients, wherein the I/O request requests data from the parallel-access storage device of the plurality of storage devices;
   wherein each client, of the plurality of clients, is associated with a service constraint that comprises a utilization percentage of the I/O capacity of the plurality of storage devices;
   determining whether servicing the I/O request violates a service constraint associated with the client, comprising:
      determining an estimated cost for the I/O request using an I/O cost metric that is based on a particular calibration-based system performance metric, of the one or more calibration-based system performance metrics,
      determining whether a total estimated cost of I/O requests for the client exceeds a total cost limit for the client,
      wherein the total estimated cost of I/O requests for the client comprises the estimated cost for the I/O request and any estimated costs for any other I/O requests issued for the client during a current time quantum, and
      wherein the total cost limit for the client is based, at least in part, on the service constraint associated with the client;
   in response to determining that servicing the I/O request violates the service constraint for the client, placing the I/O request in a hold queue;
   after placing the I/O request in the hold queue, determining that servicing the I/O request no longer violates the service constraint for the client;
   in response to determining that servicing the I/O request no longer violates the service constraint for the client, servicing the I/O request by the parallel-access storage device;
   wherein the method is performed by one or more computing devices.

2. The computer-executed method of claim 1, wherein:
   the computing system comprises a plurality of parallel-access storage devices, which includes the parallel-access storage device; and
   said determining the I/O cost metric based on the calibration-based system performance metric comprises:
      determining a device-specific performance metric, from the particular calibration-based system performance metric, based, at least in part, on a total number of the plurality of parallel-access storage devices, and
      determining the I/O cost metric based at least in part, on the device-specific performance metric.

3. The computer-executed method of claim 1, wherein:
   the I/O cost metric is included in a plurality of I/O cost metrics that are based on the one or more calibration-based system performance metrics;
   said determining the estimated cost for the I/O request based, at least in part, on the I/O cost metric further comprises:
      selecting the I/O cost metric, from the plurality of I/O cost metrics, based, at least in part, on one or more attributes of the I/O request.

4. The computer-executed method of claim 3, wherein:
   the particular calibration-based system performance metric reflects a maximum I/O requests per second (IOPS) for the computing system; and
   said selecting the I/O cost metric, from the plurality of I/O cost metrics, is based, at least in part, on determining that a size of data for the I/O request is less than a threshold amount of data.

5. The computer-executed method of claim 3, wherein:
   the particular calibration-based system performance metric reflects a maximum I/O throughput for the computing system; and
   said selecting the I/O cost metric, from the plurality of I/O cost metrics, is based, at least in part, on determining that a size of data for the I/O request is greater than a threshold amount of data.

6. The computer-executed method of claim 5, wherein:
   the I/O cost metric is a throughput-based I/O cost metric;
   the plurality of I/O cost metrics includes two or more throughput-based I/O cost metrics;
   each throughput-based I/O cost metric of the two or more throughput-based I/O cost metrics (a) corresponds to a corresponding range of I/O request sizes, and (b) is determined based on the corresponding range of I/O request sizes; and
   said selecting the I/O cost metric, from the plurality of I/O cost metrics, is further based, at least in part, on determining that the size of data for the I/O request is within a particular range of I/O request sizes that corresponds to the I/O cost metric.

7. The computer-executed method of claim 1, wherein:
   the particular calibration-based system performance metric reflects a maximum I/O requests per second (IOPS) for the computing system;
   the I/O cost metric is determined based, at least in part, on the maximum IOPS for the computing system.

8. The computer-executed method of claim 1, wherein:
   the particular calibration-based system performance metric reflects a maximum throughput for the computing system;
   the I/O cost metric is determined based, at least in part, on the maximum throughput for the computing system.

9. The computer-executed method of claim 8, wherein the I/O cost metric is determined further based, at least in part, on an estimated I/O request size.

10. The computer-executed method of claim 1, wherein:
the parallel-access storage device is one of a plurality of parallel-access storage devices; and
the plurality of parallel-access storage devices includes two or more of a group of types of devices, the group of types of devices comprising: flash devices, precision memory devices, phase-change memory (PCM), parallel-access persistent memory, parallel random access machines (PRAM), dynamic random access memory (DRAM) devices, static random-access memory.

11. The computer-executed method of claim 1, wherein:
said detecting performance data for the plurality of storage devices of the computing system comprises:
running one or more test workloads on the computing system,
wherein said running the one or more test workloads results in parallel accesses in one or more parallel-access devices of the computing system, and
detecting one or more performance measurements based on said running the one or more test workloads; and
said determining the one or more calibration-based system performance metrics is based, at least on part, on the one or more performance measurements.

12. One or more non-transitory computer-readable media storing instructions that, when executed by one or more processors, cause:
detecting performance data for a plurality of storage devices of a computing system, the plurality of storage devices comprising a parallel-access storage device;
based on the detected performance data for the plurality of storage devices, determining one or more calibration-based system performance metrics measuring performance of the plurality of storage devices;
wherein each calibration-based system performance metric, of the one or more calibration-based system performance metrics, is a throughput metric or an I/O per second (IOPS) metric;
receiving an I/O request from a client, of a plurality of clients, wherein the I/O request requests data from the parallel-access storage device of the plurality of storage devices;
wherein each client, of the plurality of clients, is associated with a service constraint that comprises a utilization percentage of the I/O capacity of the plurality of storage devices;
determining whether servicing the I/O request violates a service constraint associated with the client, comprising:
determining an estimated cost for the I/O request using an I/O cost metric that is based on a particular calibration-based system performance metric, of the one or more calibration-based system performance metrics,
determining whether a total estimated cost of I/O requests for the client exceeds a total cost limit for the client,
wherein the total estimated cost of I/O requests for the client comprises the estimated cost for the I/O request and any estimated costs for any other I/O requests issued for the client during a current time quantum, and
wherein the total cost limit for the client is based, at least in part, on the service constraint associated with the client;
in response to determining that servicing the I/O request violates the service constraint for the client, placing the I/O request in a hold queue;
after placing the I/O request in the hold queue, determining that servicing the I/O request no longer violates the service constraint for the client;
in response to determining that servicing the I/O request no longer violates the service constraint for the client, servicing the I/O request by the parallel-access storage device.

13. The one or more non-transitory computer-readable media of claim 12, wherein:
the computing system comprises a plurality of parallel-access storage devices, which includes the parallel-access storage device; and
said determining the I/O cost metric based on the calibration-based system performance metric comprises:
determining a device-specific performance metric, from the particular calibration-based system performance metric, based, at least in part, on a total number of the plurality of parallel-access storage devices, and
determining the I/O cost metric based at least in part, on the device-specific performance metric.

14. The one or more non-transitory computer-readable media of claim 12, wherein:
the I/O cost metric is included in a plurality of I/O cost metrics that are based on the one or more calibration-based system performance metrics;
said determining the estimated cost for the I/O request based, at least in part, on the I/O cost metric further comprises:
selecting the I/O cost metric, from the plurality of I/O cost metrics, based, at least in part, on one or more attributes of the I/O request.

15. The one or more non-transitory computer-readable media of claim 14, wherein:
the particular calibration-based system performance metric reflects a maximum I/O requests per second (IOPS) for the computing system; and
said selecting the I/O cost metric, from the plurality of I/O cost metrics, is based, at least in part, on determining that a size of data for the I/O request is less than a threshold amount of data.

16. The one or more non-transitory computer-readable media of claim 14, wherein:
the particular calibration-based system performance metric reflects a maximum I/O throughput for the computing system; and
said selecting the I/O cost metric, from the plurality of I/O cost metrics, is based, at least in part, on determining that a size of data for the I/O request is greater than a threshold amount of data.

17. The one or more non-transitory computer-readable media of claim 16, wherein:
the I/O cost metric is a throughput-based I/O cost metric;
the plurality of I/O cost metrics includes two or more throughput-based I/O cost metrics;
each throughput-based I/O cost metric of the two or more throughput-based I/O cost metrics (a) corresponds to a corresponding range of I/O request sizes, and (b) is determined based on the corresponding range of I/O request sizes; and said selecting the I/O cost metric, from the plurality of I/O cost metrics, is further based, at least in part, on determining that the size of data for the I/O request is within a particular range of I/O request sizes that corresponds to the I/O cost metric.

18. The one or more non-transitory computer-readable media of claim 12, wherein:
    the particular calibration-based system performance metric reflects a maximum I/O requests per second (IOPS) for the computing system;
    the I/O cost metric is determined based, at least in part, on the maximum IOPS for the computing system.

19. The one or more non-transitory computer-readable media of claim 12, wherein:
    the particular calibration-based system performance metric reflects a maximum throughput for the computing system;
    the I/O cost metric is determined based, at least in part, on the maximum throughput for the computing system.

20. The one or more non-transitory computer-readable media of claim 19, wherein the I/O cost metric is determined further based, at least in part, on an estimated I/O request size.

21. The one or more non-transitory computer-readable media of claim 12, wherein:
    the parallel-access storage device is one of a plurality of parallel-access storage devices; and
    the plurality of parallel-access storage devices includes two or more of a group of types of devices, the group of types of devices comprising: flash devices, precision memory devices, phase-change memory (PCM), parallel-access persistent memory, parallel random access machines (PRAM), dynamic random access memory (DRAM) devices, static random-access memory.

22. The one or more non-transitory computer-readable media of claim 12, wherein:
    said detecting performance data for the plurality of storage devices of the computing system comprises:
        running one or more test workloads on the computing system,
        wherein said running the one or more test workloads results in parallel accesses in one or more parallel-access devices of the computing system, and
        detecting one or more performance measurements based on said running the one or more test workloads; and
    said determining the one or more calibration-based system performance metrics is based, at least on part, on the one or more performance measurements.

* * * * *